United States Patent
Roche et al.

(10) Patent No.: US 8,051,230 B2
(45) Date of Patent: Nov. 1, 2011

(54) SYNCHRONOUS DATA TRANSMISSION METHOD

(75) Inventors: Franck Roche, Trets (FR); Pierre Tarayre, Brie Et Angonnes (FR)

(73) Assignee: STMicroelectronics S.A., Montrouge (FR)

( * ) Notice: Subject to any disclaimer, the term of this patent is extended or adjusted under 35 U.S.C. 154(b) by 1873 days.

(21) Appl. No.: 10/039,765

(22) Filed: Nov. 7, 2001

(65) Prior Publication Data

US 2002/0146042 A1  Oct. 10, 2002

(30) Foreign Application Priority Data

Nov. 29, 2000  (FR) ..................................... 00 15387

(51) Int. Cl.
 *G06F 13/42* (2006.01)
(52) U.S. Cl. ...................................... 710/105; 710/110
(58) Field of Classification Search .................. 710/105, 710/110
 See application file for complete search history.

(56) References Cited

U.S. PATENT DOCUMENTS

| | | | |
|---|---|---|---|
| 4,301,532 A | | 11/1981 | Janetzky |
| 4,689,740 A | * | 8/1987 | Moelands et al. ............ 713/600 |
| 5,341,131 A | * | 8/1994 | Hoshino et al. .......... 340/825.21 |
| 5,412,783 A | | 5/1995 | Skokan |
| 5,710,890 A | * | 1/1998 | Hermer ......................... 710/106 |
| 5,925,135 A | * | 7/1999 | Trieu et al. ..................... 713/400 |
| 2005/0268142 A1 | * | 12/2005 | Saripalli et al. ............... 713/600 |

OTHER PUBLICATIONS

The I2C-Bus Specification, Version 2.1, Jan. 2000.*
SPI Block Guide, V03.06, Freescale Semiconductor, Inc., Jan. 21, 2000.*
System Management Bus Specification, Version 2.0, SBS Implemeters Forum, Aug. 3, 2000.*
A. Moelands: I²C Bus in Consumer Applications , vol. 5, No. 4, Sep. 1983 pp. 214-221.
Patent abstracts of Japan, vol. 016, No. 448 dated Sep. 17, 1992, p. 1423 & JP 04 157553 entitled Single-Line Handshake System.

* cited by examiner

*Primary Examiner* — Mark Rinehart
*Assistant Examiner* — Nimesh G Patel
(74) *Attorney, Agent, or Firm* — Lisa K. Jorgenson; Allen, Dyer, Doppelt, Milbrath & Gilchrist, P.A.

(57) ABSTRACT

The method is for transmitting data between two devices via a clock wire or line and at least one data wire or line. The clock wire is maintained by default on a logic value A, and each device is capable of tying the clock wire to an electric potential representing a logic value B that is the opposite of A. According to the method, both devices tie the clock wire to B when a datum is transmitted, the device to which the datum is sent does not release the clock wire while it has not read the datum, and the device sending the datum maintains the datum on the data wire at least until an instant when the clock wire is released by the device to which the datum is sent. The method is particularly applicable to communication between a microcomputer and a microprocessor.

9 Claims, 6 Drawing Sheets

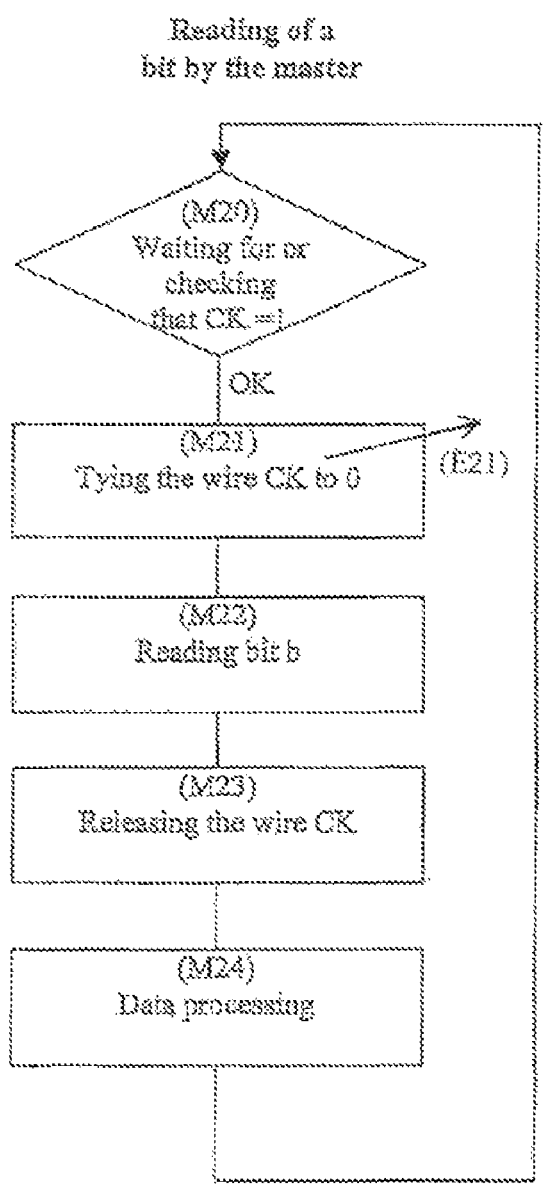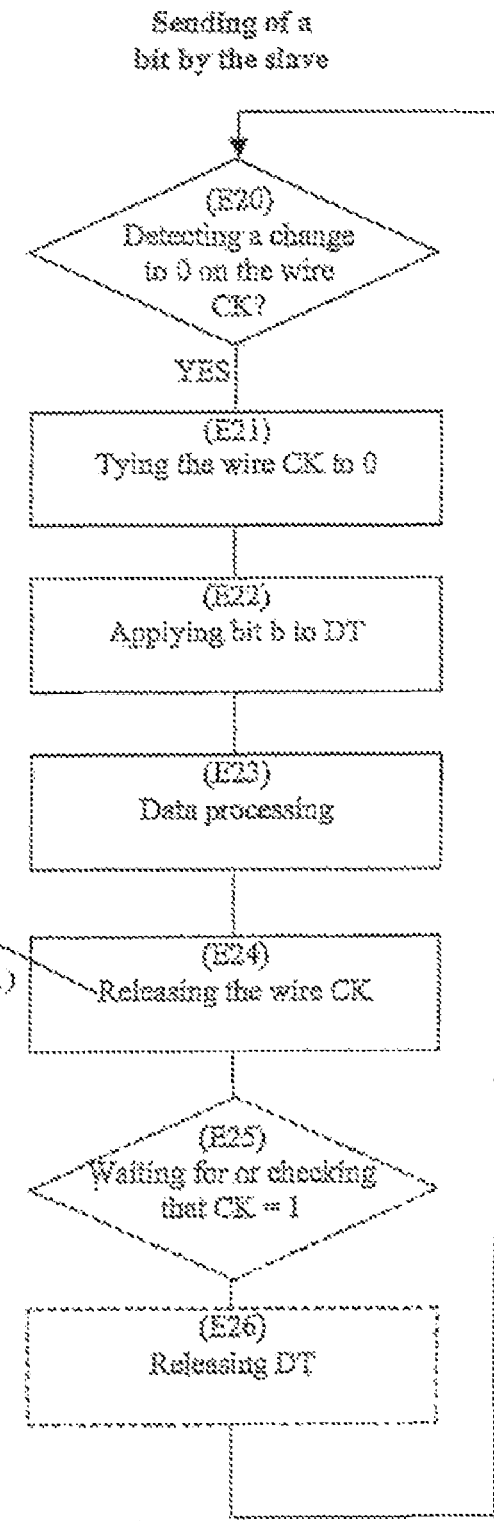
FIG. 4A
FIG. 4B

SYNCHRONOUS DATA TRANSMISSION METHOD

FIELD OF THE INVENTION

The present invention relates to data transmission between digital systems, and, more particularly, to data transmission between a microprocessor and a microcomputer or between two microprocessors.

BACKGROUND OF THE INVENTION

Since the advent of the era of digital computers, digital data transmission methods have been extremely important in the implementation of computer systems, and various developments have been made. Generally, data transmission methods are based on a physical link also referred to as the "physical layer", which ensures the physical transmission of electric signals between two points on a line, according to a determined protocol defining the form and duration of the electric signals. Combined with the physical layer, this protocol is completed by a communication protocol, or data link layer, which allows data transfer to be organized while avoiding collisions, by allocating specific data send or receive and synchronization rules between the communicating devices. This second-level protocol is then completed by a third-level protocol made up of commands, transmitted via the physical layer, each command being formed by a bit string the format, content and direction of which comply with predefined rules. In very high-level networks like computer networks or digital telephony networks, there is, beyond these first levels, a substantial hierarchy of protocols that guarantee network consistency in synergy.

The present invention relates to a low-level data transmission method located at the data link layer level, and is intended for industrial applications such as communication between a microcomputer and a microprocessor, to perform test or maintenance operations on the microprocessor using the microcomputer for example, or for communication between two microprocessors, such as two microprocessors arranged on a single printed circuit board for example.

Out of the data transmission methods most commonly used in this field, both synchronous and asynchronous methods can be found. Synchronous methods can be distinguished from asynchronous methods by the existence of a clock wire or line conveying a clock signal sent by a master device, and the other device or devices synchronize with this clock signal to receive or send data. The advantage of synchronous methods is that they allow very long bit strings to be transmitted due to the synchronization performed by the common clock signal. On the other hand, they require several wires to carry the various control signals (RX, TX, RS, TS . . . ) enabling the devices to synchronize their actions.

More particularly, synchronous communication methods have three main drawbacks for the above-mentioned applications. On the one hand, they require the reservation of several microprocessor inputs/outputs to allow control signals to be transmitted. On the other hand, they require provision, in the microprocessor, for specific interface circuits that manage the communication protocol, such as so-called USART circuits (Universal Synchronous Asynchronous Receiver Transmitter), the cost price and size of which are substantial. Finally, they need the respective internal clocks of the two devices that are to converse to be compatible. Moreover, one of the devices may operate in multitasking mode and not be available to send or receive data when prompted by the other device.

Asynchronous data transmission methods are advantageous in that they can be implemented using only two wires or lines, but they also require a specific communication interface circuit, such as a UART circuit (Universal Asynchronous Receiver Transmitter), which manages the communication protocol and includes buffer registers to store the bit strings to be sent or received. Asynchronous communication also needs clock frequencies that are tuned, as a device operating at a determined frequency is unable to receive asynchronous data sent by a device operating at a much higher frequency.

SUMMARY OF THE INVENTION

An object of the present invention is to provide a data transmission method that is of the synchronous type and which enables two devices with very different clock frequencies, where applicable, to communicate.

Another object of the present invention is to provide such a synchronous method that can be implemented with only two wires or lines, for serial data transmission.

These objects are achieved by providing a method for transmitting data between two devices, with a clock wire and at least one data wire, the clock wire being maintained by default on a logic value A, in which each device can tie the clock wire to an electric potential representing a logic value B that is the opposite of A. When a datum is transmitted, the two devices tie the clock wire to B. The device to which the datum is sent does not release the clock wire while it has not read the datum, and the device sending the datum maintains the datum on the data wire at least until an instant when the clock wire is released by the device to which the datum is sent.

According to one embodiment, one of the devices is master and the other slave, the master being distinguished from the slave by the fact that it is the first to tie the clock wire to B when a datum is transmitted, regardless of the direction in which the datum is transmitted.

According to one embodiment, when the master must send a datum to the slave, the master applies the datum to the data wire, then ties the clock wire to B.

According to one embodiment, when the slave must receive a datum from the master, the slave detects the value B on the clock wire, then ties the clock wire to B and reads the datum.

According to one embodiment, the time that the slave has to release the clock wire after receiving a datum, is independent of any action by the master, as the master does not send any new datum while the slave has not released the clock wire.

According to one embodiment, when the master must receive a datum from the slave, the master ties the clock wire to B.

According to one embodiment, when the slave must send a datum to the master, the slave detects the value B on the clock wire, then ties the clock wire to B and applies the datum to the data wire.

According to one embodiment, the time that the slave has to release the clock wire after sending a datum, is independent of any action by the master, as the master does not tie the clock wire to B to request sending a new datum while the slave has not released the clock wire.

According to one embodiment, when the clock wire has the logic value A, the time that the master has to tie the clock wire to B is independent of any action by the slave.

According to one embodiment, the method comprises a step of equipping the slave with a communication interface circuit comprising: a trigger to automatically tie the clock wire to B when the clock wire changes from A to B, an input to apply a clock wire release signal to the trigger, and an output to deliver an information signal that has a first value when the clock wire is tied to B by the trigger and a second value when the clock wire is released by the trigger.

According to one embodiment, the method comprises a step of further providing, in the communication interface circuit: means for storing at least one datum, and means for automatically applying the datum to the data wire when the clock wire changes from A to B.

According to one embodiment, A=1 and B=0.

The present invention also relates to a master-type transmitting/receiving device comprising a connection terminal to a clock wire, at least one connection terminal to a data wire, means for tying the clock wire to an electric potential B representing a logic value that is the opposite of a logic value A, and means for performing the following operations, when a datum is to be sent: checking or waiting for the clock wire to have the logic value A, applying the datum to the data wire, tying the clock wire to B, then releasing the clock wire, and maintaining the datum on the data wire at least until an instant when the clock wire has the logic value A.

According to one embodiment, the device further comprises means for performing the following operations, when a datum is to be received: checking or waiting for the clock wire to have the logic value A, tying the clock wire to B, reading the datum on the data wire, then releasing the clock wire.

The present invention also relates to a slave-type data transmitting/receiving device intended to communicate with a master-type device as described above, comprising a connection terminal to a clock wire, at least one connection terminal to a data wire, means for tying the clock wire to an electric potential B representing a logic value that is the opposite of a logic value A, and means for performing the following operations, when a datum is to be received: detecting a change from A to B on the clock wire, tying the clock wire to B, reading the datum on the data wire, and releasing the clock wire.

According to one embodiment, the slave-type device further comprises means for performing the following operations, when a datum is to be sent: detecting a change from A to B on the clock wire, tying the clock wire to B, applying the datum to the data wire, and releasing the clock wire.

The present invention also relates to a synchronous data transmission system, comprising a master-type device as described above that is linked by a clock wire and at least one data wire to a slave-type device as described above.

The present invention also relates to a slave-type communication interface circuit that is linked or intended to be linked via a clock wire and at least one data wire to a master-type device as described above, the interface circuit comprising means for tying the clock wire to an electric potential B representing a logic value that is the opposite of a logic value A, trigger means to automatically tie the clock wire to B when the clock wire changes from A to B, an input to apply a clock wire release signal to the trigger means, and an output to deliver an information signal that has a first value when the clock wire is tied to B by the trigger means and a second value when the clock wire is released by the trigger means.

According to one embodiment, the communication interface circuit further comprises means for storing at least one datum, and means for automatically applying the datum to the data wire when the clock wire changes from A to B.

BRIEF DESCRIPTION OF THE DRAWINGS

These and other objects, features and advantages of the present invention shall be described in greater detail in the following description of the method of the present invention, in relation with the following figures:

FIGS. 4A and 4B are flow charts representing steps of the method according to the present invention respectively performed by a master device and a slave device when a datum is sent by the slave;

DETAILED DESCRIPTION OF THE PREFERRED EMBODIMENTS

Figure 1:
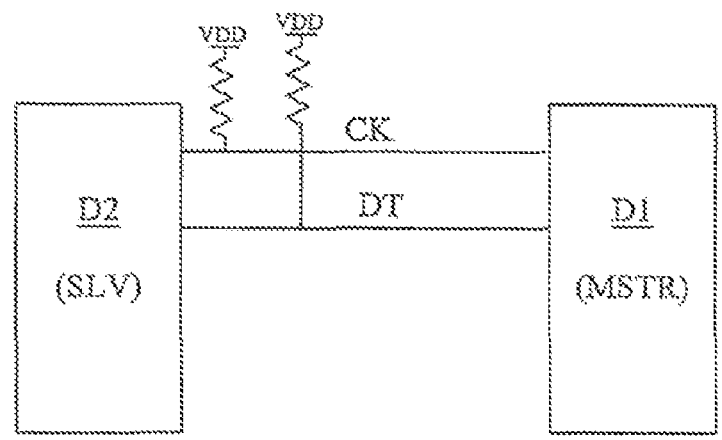
FIG. 1 is a schematic diagram illustrating an the implementation of the method of the present invention via only two wires or lines.

FIG. 1 schematically illustrates an example of the implementation of the method according to the present invention to achieve a synchronous data link between two devices D1 and D2, using only two wires, one wire being used as a clock wire CK and the other as a data wire DT. The clock wire is maintained by default on a determined logic value, here the value "1", obtained, for example, via a pull-up resistor connected between the clock wire CK and a voltage source VDD representing the logic "1". Preferably, the data wire DT is also maintained by a pull-up resistor on a determined logic value, here the value "1".

According to the present invention, each device D1, D2 can perform two actions on the clock wire CK: 1) tying the clock wire CK to the logic value that is the opposite of the default value, i.e. here tying the CK wire to 0; and 2) releasing the clock wire CK, so that it returns to the default logic value.

According to the present invention, these two basic actions are used to synchronize data transmission between the devices D1 and D2 by applying the following general rules: 1) the two devices tie the clock wire to 0 when a datum is transmitted; 2) the device sending the datum maintains the datum on the data wire DT at least until the instant when the clock wire is released by the device that is to read the datum; and 3) the device that is to read the datum only releases the clock wire CK after reading the datum.

It can be noted here that the expression "tie to 0" (or "tie low") has been preferred to the expression "force to 0" in the present description, although the two expressions are very similar. In fact, saying that a device "forces the clock wire to 0" may imply that the device changes the clock signal to 0. Yet, in the method of the present invention, a device can force the clock wire to 0 while the clock wire is already forced to 0 by the other device. In these conditions, the verb "tie" seems more appropriate.

The operations performed by each of the devices to transmit a datum will now be described. One of the devices, D1 for example, will be called the master device (MSTR) and the other device D2 will be called the slave device (SLV). It should be noted that the terms "master" and "slave" are not used here in the typical meaning of these terms. Here, the master device is distinguished from the slave device by the fact that the master is always the first to tie the clock wire CK to 0. For this purpose, the master has an amount of time that is independent of the actions by the slave. To release the clock wire CK after delivering or reading a datum on the data wire DT, the slave also has an amount of time that is independent of the actions by the master.

Thus, the case in which data are sent by the master shall be distinguished from the case in which data are sent by the slave.

Data Transmission in the Master-To-Slave Direction

Figure 2A:
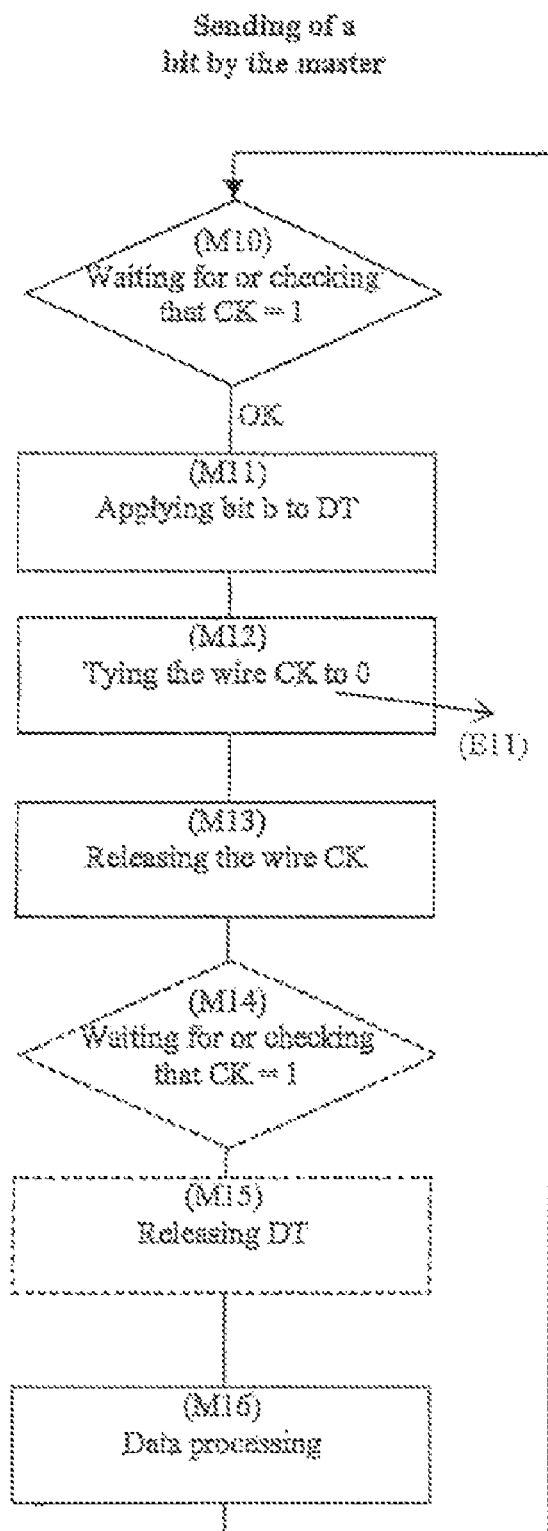
FIG. 2A and 2B are flow charts representing steps of the method according to the present invention respectively performed by a master device and a slave device when a datum is sent by the master.

The actions performed by the master to send a datum bit to the slave are described in the flow chart in FIG. 2A, and include the following steps:

Step M10: Waiting for or checking that CK=1
Step M11: Applying the bit b to DT
Step M12: Tying the wire CK to 0
Step M13: Releasing CK
Step M14: Waiting for or checking that CK=1
Step M15: Releasing DT
Step M16: Data processing First of all, it can be seen that the master does not apply the bit b to the wire DT (step M11) while the wire CK is not on 1 (step M10). In fact, if the wire CK is still on 0, that means that the slave is not ready to receive the datum, because it is reading a previously sent datum, because it is busy with other tasks, or because its clock is very slow, and in practice these various possibilities can accumulate. Therefore, here it would seem that sending a new datum is subject to the "authorization" of the slave, and that this authorization is only acquired from the moment the wire CK is released (is on 1).

When the wire CK is released, the master starts by applying the datum to the wire DT in step M11, then ties the wire CK to 0 in step M12, to inform the slave that the datum is available, and then releases the wire CK in step M13. The application of the datum to the wire DT before the wire CK is set to 0 guarantees that the datum will be available to the slave as soon as it has detected the falling edge on the wire CK.

The "data processing" step M16 means any operation likely to be performed by the master before returning to step M10 to send a new datum. Thus, the master can delay sending a new datum independently of the slave, because it is reading the datum in an internal memory or it is preparing the datum on its output, because it is busy with other tasks, or because its clock is very slow in relation to that of the slave, and in practice these various possibilities can accumulate. Thus, here it seems that sending a datum is also subject to the availability of the master.

Steps M14 and M15, represented by dotted lines on the flow chart in FIG. 2A, are optional when transmitting a bit string. In fact, the datum applied to the wire DT in step M11 can be maintained on the wire DT until the next step M11, which corresponds to sending the next bit. The verification step M14 then becomes redundant with the verification step M10.

Figure 2B:
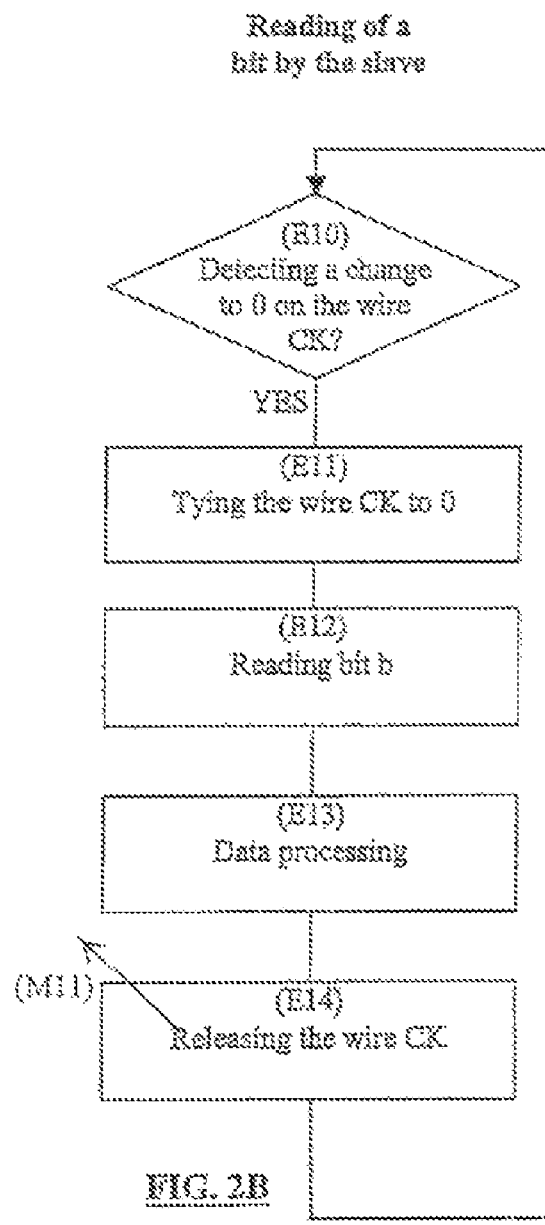

The actions performed by the slave to read a datum sent by the master are described in the flow chart in FIG. 2B, and include the following steps:

Step E10: Detecting a change to 0 on the wire CK
Step E11: Tying the wire CK to 0
Step E12: Reading bit b
Step E13: Data processing
Step E14: Releasing CK First of all it can be seen that the slave only reads the datum in step E12 after detecting a falling edge in step E10. In fact, the detection of a transition of the default logic value, here "1", to the opposite logic value, here "0", here means that a datum has been applied to the wire DT by the master. Furthermore, tying the wire CK to 0 in step E11 before reading the datum in step E12 allows the slave to prevent the master from applying another datum to the wire DT, while the slave has not finished reading the datum and has not given notice that it is ready to receive a new datum by releasing the wire CK in step E14. Thus, between the reading step E12 and the step E14 in which the wire CK is released, the slave has the benefit of a "data processing" step E13 that is not under the master's control, and that it can use to store the datum received or to perform other tasks, the duration of this step being a function of the slave clock frequency and the other tasks that it is likely to have to accomplish.

As already seen, sending a new datum is thus subject to the availability of the slave. The cause and effect relationship that exists between the step E14 on the slave side and the change from the step M10 to the step M11 on the master side, is marked by an arrow in FIGS. 2A and 2B. The cause and effect relationship between the step M12 on the master side and the change from the step E10 to the step E11 on the slave side is marked by another arrow.

In practice, the action of tying the wire CK to 0, performed by the slave in step E11, and which follows the action performed by the master in step M12, can be automatically and almost immediately performed via a trigger circuit sensitive to a falling edge on the wire CK. In this case, the step E10 is an implicit step in the operation of such a trigger circuit, an example of which will be described below.

Finally, it can be seen that each of these devices is partially master of the wire CK, despite the qualifications of "master" and "slave" used to distinguish the two devices. As a result, each of the devices can impose its operating speed on the other, in the event of disparity of clock frequencies or when one of the devices operates in multitasking on applications that have priority over the data transmission itself.

Figure 3A:
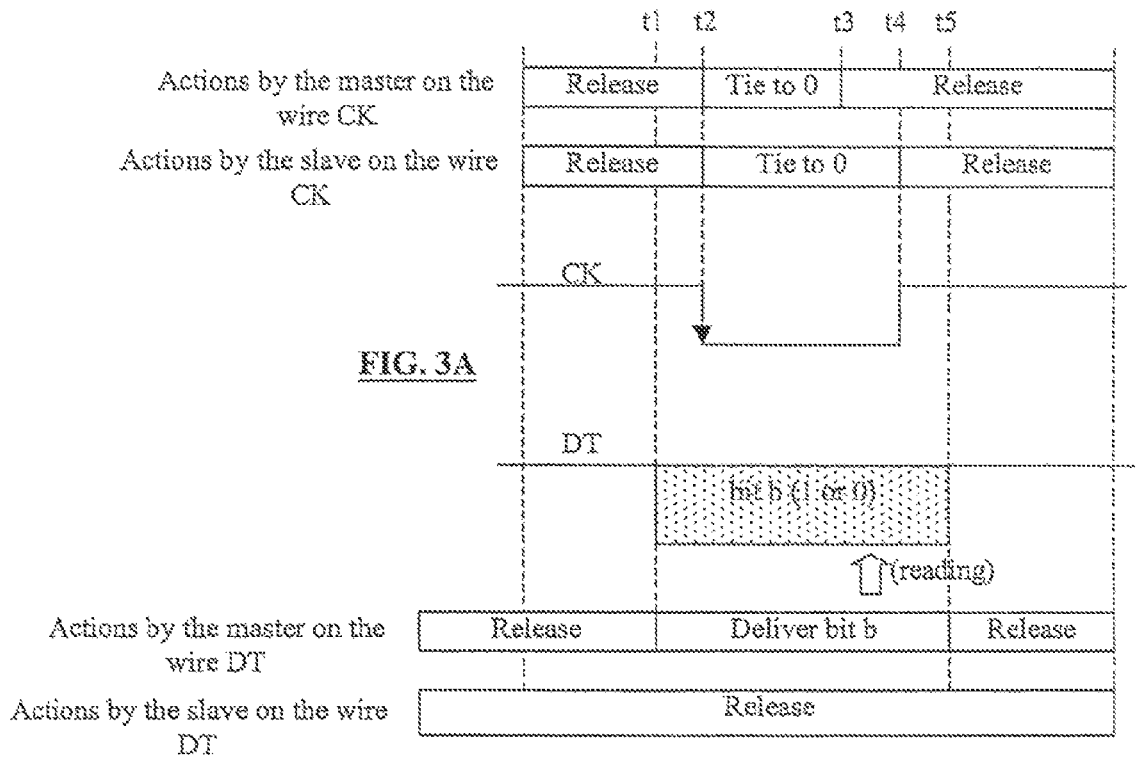
FIGS. 3A and 3B are timing diagrams representing signals present on a clock wire and a data wire when a datum is sent by the master, respectively when the master is faster than the slave and when the slave is faster than the master.
Figure 3B:
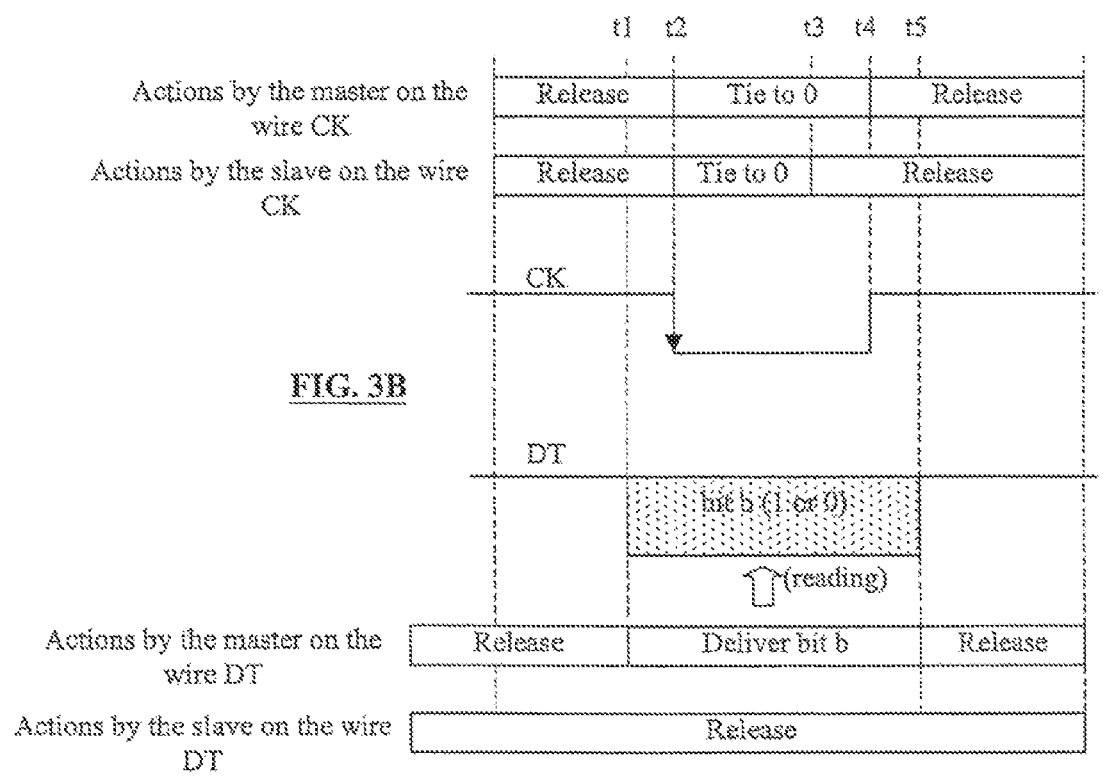

FIGS. 3A and 3B give a global view of the method of the present invention for data transmission in the master-to-slave direction. In these two figures, it can be seen that the master applies the datum (the bit b) to the wire DT at an instant t1, and ties the wire CK to 0 at an instant t2. For its part, the slave ties the wire CK to 0 roughly at a same instant t2. Here, it is assumed that this action is done automatically by a latch circuit, as mentioned above.

FIG. 3A illustrates the case in which the master is faster than the slave. It can be seen that the master releases the wire CK at an instant t3 while the slave only releases the wire CK at an instant t4 that is subsequent to t3. In this case, it is therefore the slave that imposes its rhythm to the data transmission. The bit is read by the slave at any instant between t2 and t4.

FIG. 3B illustrates the case in which the slave is faster than the master. Here, the slave releases the wire CK at an instant t3 while the master only releases the wire CK at an instant t4 that is subsequent to t3. In this case, it is therefore the master that imposes its rhythm to the data transmission. The bit is read by the slave at any instant between t2 and t3.

As mentioned above, the releasing of the data wire DT by the master, at an instant t5, is optional if a new datum is to be sent.

Data Transmission in the Slave-To-Master Direction

The actions performed by the slave to send a datum bit to the master are described in the flow chart in FIG. 4B, and include the following steps:

Step E20: Detecting a change to 0 on the wire CK
Step E21: Tying the wire CK to 0
Step E22: Applying bit b to DT
Step E23: Data processing
Step E24: Releasing CK
Step E25: Waiting for or checking that CK=1
Step E26: Releasing DT Here, the slave only applies a bit to the wire DT after detecting a change to 0 on the wire CK in step E20. In fact, it is the master that initiates a data transmission, whether the bit is sent by the master or by the slave. The application of the bit to the wire DT in step E22 is preceded by step E21 in which the slave ties the wire CK to 0. It will be seen below that steps E21 and E22 can, in practice, be simultaneous or quasi-simultaneous, as: — the datum can be prepared in an output buffer provided on the slave side; — a first trigger circuit can be provided on the slave side to automatically tie the wire CK to 0 when a falling edge occurs on the wire CK; and — a second trigger circuit can be provided on the slave side to automatically act on the output buffer so that it delivers the datum to the wire DT when the level 0 occurs on the wire CK.

In these conditions, the detection step E20 is implicit in the operation of the first trigger circuit. Moreover, as steps E20-E21 are identical to steps E10-E11 described above (FIG. 2B), they can be performed automatically by the same trigger circuit, as will be seen below. The "data processing" step E23 that precedes step E24 of releasing the wire CK, means, as above, any operation likely to be performed by the slave, the duration of which is not under the master's control. Thus, the slave prevents the master from initiating any new transmission of a bit (step M21 described below) while it has not released the wire CK.

Steps E25 and E26, represented by dotted lines on FIG. 4B, are optional for bit string transmission. In fact, the datum applied to the wire DT in step E22 can be maintained on the wire DT until the next step E22, when the next bit of the bit string is sent. In this case, the verification step E25 is redundant with the detection step E20, as detecting a falling edge on the wire CK implies that the wire CK has previously been released by the master.

The actions performed by the master to receive a datum are described in the flow chart in FIG. 4A, and include the following steps:
Step M20: Waiting for or checking that CK=1
Step M21: Tying the wire CK to 0
Step M22: Reading the bit b
Step M23: Releasing CK
Step M24: Data processing The master initiates the communication in step M20 by tying the wire CK to 0. Here, this tie to 0 corresponds to a request to send a bit. Before tying the wire CK to 0, the master checks in step M20 that the wire CK has been freed by the slave, which means that the slave is ready. After tying the wire CK to 0, the master reads the bit in step M22, then releases the wire CK in step M23. The master then has a "data processing" step M24, to store the bit received in its memory for example, the duration of which is not under the slave's control as the latter could not send any new datum while the master has not tied the wire CK to 0 again in step M21.

In FIGS. 4A and 4B, an arrow shows the cause and effect relationship between step M21 on the master side and the change from step E20 to step E21 on the slave side. Another arrow shows the cause and effect relationship between step E24 on the slave side and the change from step M20 to step M21 on the master side.

Figure 5A:
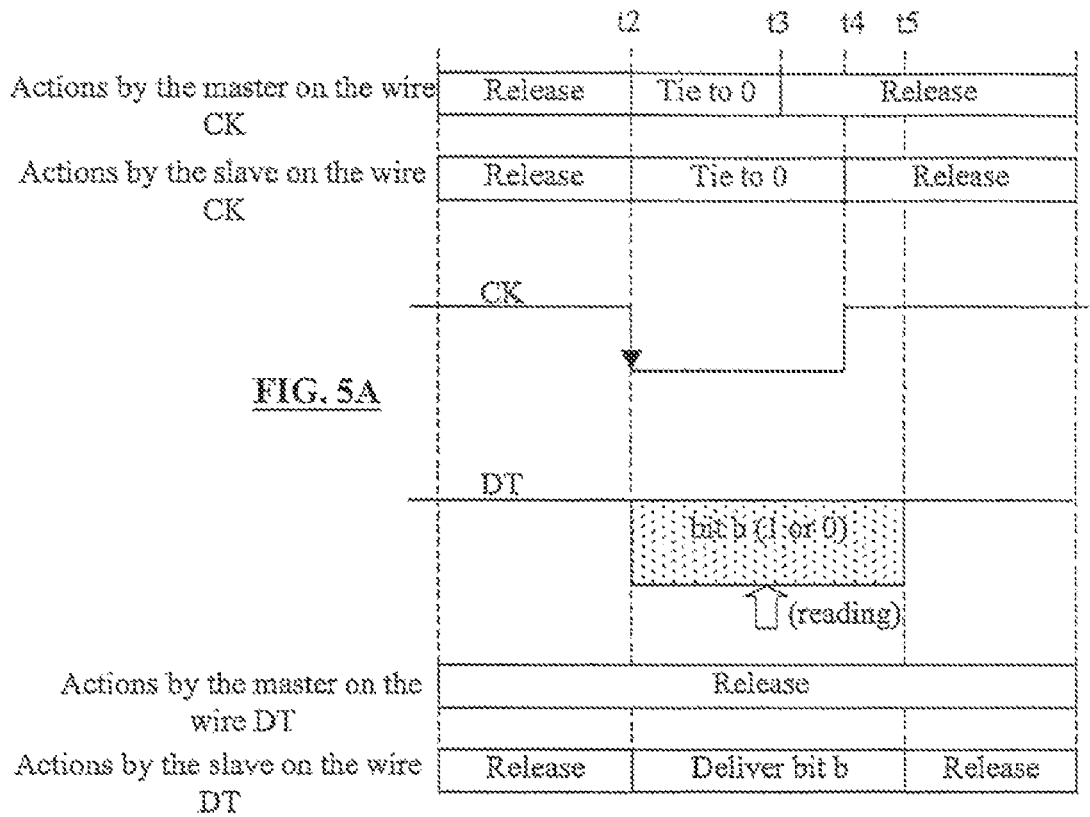
FIGS. 5A and 5B are timing diagrams representing the aspect of signals present on a clock wire and a data wire when a datum is sent by the slave, respectively when the master is faster than the slave and when the slave is faster than the master.
Figure 5B:
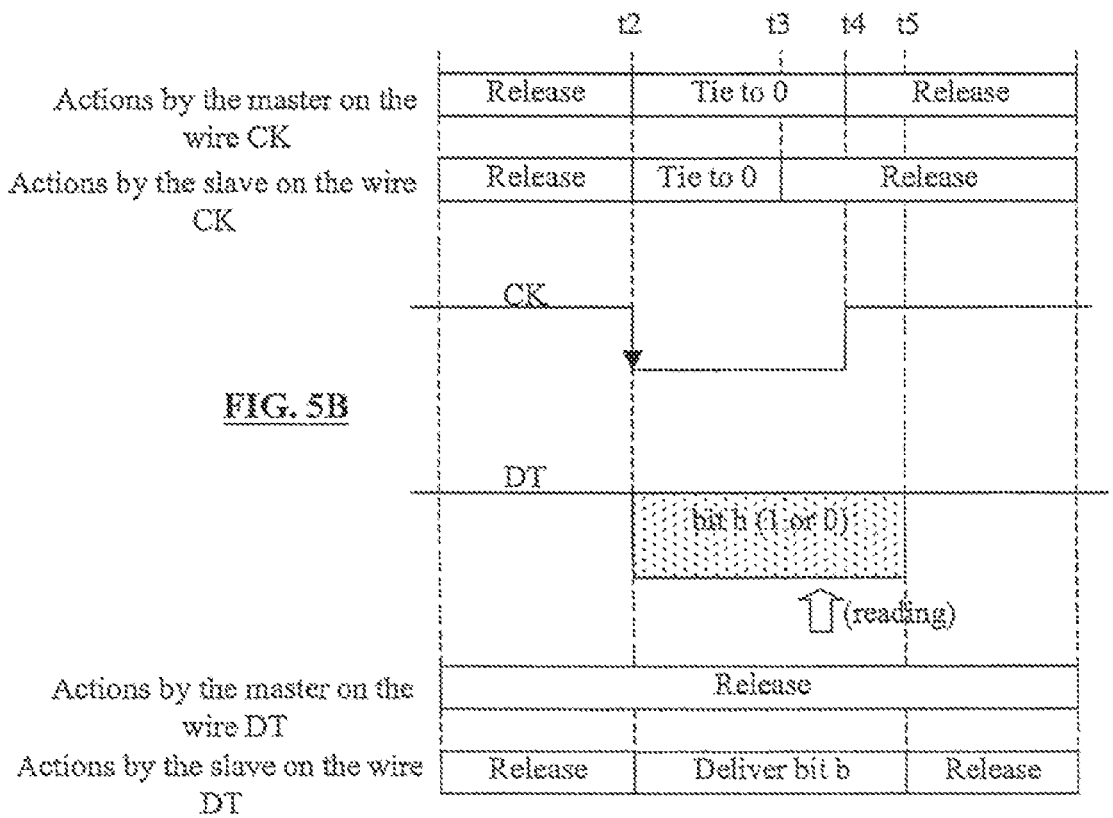

FIGS. 5A and 5B give a global view of the method of the present invention for data transmission in the slave-to-master direction. In these two figures, it can be seen that the slave ties the wire CK to 0 and applies the datum (the bit b) to the wire DT at the instant t2 when the master ties the wire CK to 0, both operations being simultaneous or quasi-simultaneous here due to the use of an output buffer and trigger circuits described below.

FIG. 5A illustrates the case in which the master is faster than the slave and releases the wire CK at an instant t3, while the slave only releases the wire CK at an instant t4 that is subsequent to t3. Thus, the bit is read by the master at any instant between instants t2 and t3. FIG. 5B illustrates the case in which the slave is faster than the master and releases the wire CK at an instant t3, while the master only releases the wire CK at an instant t4 that is subsequent to t3. Thus, the bit is read by the master at any instant between instants t2 and t4.

As above, the release at an instant t5 of the data wire DT is optional if a new datum is to be sent by the slave. However, in practice, to avoid a conflict on the data wire when the data transmission direction is changed, the release of the data wire DT must preferably be implicit and automatic, and the instant t5 must occur immediately after the instant t4.

Embodiment of a Communication Interface Circuit for the Slave Device

Figure 6:
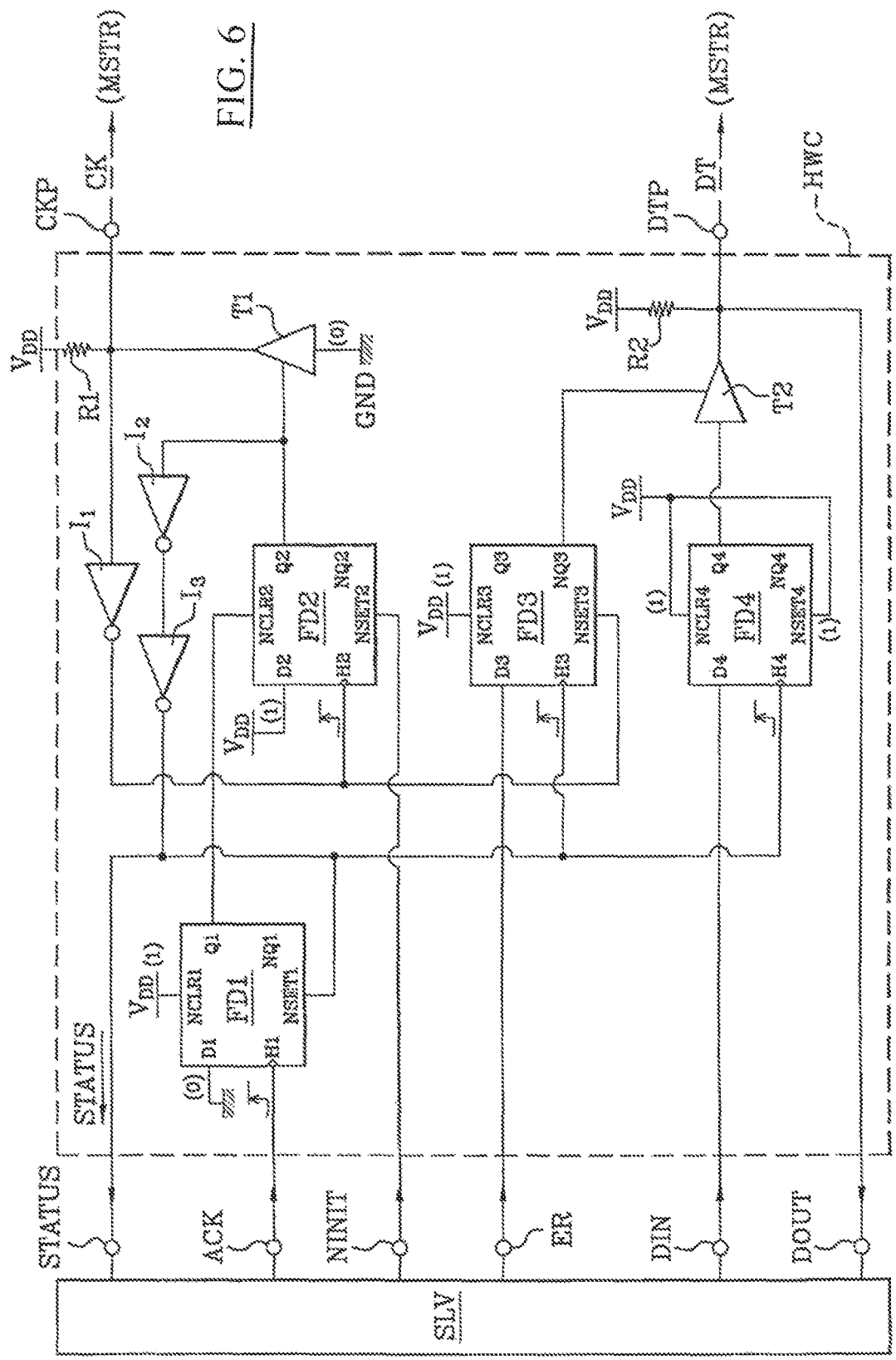
FIG. 6 is a schematic diagram of a communication interface circuit according to the present invention, combined with a slave device.

FIG. 6 represents, in a non-limiting way, an example of embodiment of a communication interface circuit HWC intended to be combined with the slave device SLV to automatically perform some steps of the method of the present invention, i.e.: 1) tying the clock wire CK to 0 in reaction to a falling edge on the clock wire; and 2) applying a datum bit to the wire DT in reaction to a level 0 on the clock wire. In practice, such a circuit HWC can be integrated into the slave device or can be embodied in an external box connected to the slave device, as will be seen below.

Here, the circuit HWC comprises four flip-flops D, respectively FD1 to FD4, two tristate buffers T1, T2 and three inverting gates I1, I2, I3 of the Schmitt Trigger type (i.e. switch hysteresis), the inverting gates I2 and I3 being arranged in series. The circuit HWC also comprises inputs/outputs connected to the slave device out of which an input ACK ("Acknowledge") that is active on the rising edge, an input NINIT ("Initialization") that is active at low level, an input ER to select the operating mode (Send or Receive), a data input DIN, a data output DOUT (Data Out) and an output STATUS that delivers a control signal of the same name can be distinguished. The circuit HWC also comprises a terminal CKP connected to the wire CK, a terminal DTP connected to the wire DT, a pull-up resistor R1 connected to the terminal CKP, and a pull-up resistor R2 connected to the terminal DTP.

Each of the flip-flops FD1 to FD4 includes:
an input D, respectively D1 to D4;
an output Q, respectively Q1 to Q4;
an inverted output NQ, respectively NQ1 to NQ4;
an input NSET to set the output Q to 1, active on low level, respectively NSET1 to NSET4;
an input NCLR to set the output Q to 0, active on low level, respectively NCLR1 to NCLR4; and
a trigger input H, respectively H1 to H4, active on the rising edge, to deliver a datum present on the input D to the output Q.

The connections between the various elements in the circuit HWC and the polarizations to 1 or to 0 of some inputs of flip-flops FD1 to FD4 are described by table 1, which is an integral part of the present description. Prior to any data exchange, the output Q1 is set to 1 by the slave. The output NQ3 is set to 0 when CK=1, and will remain at 0 when CK changes to 1.

TABLE 1

| Element | Connected to: |
| --- | --- |
| input of the inverting gate I1 | terminal CKP, wire CK |
| output of the inverting gate I1 | H2, NSET3 |
| input of the inverting gate I2 | Q2 |
| output of the inverting gate I2 | input of I3 |
| output of the inverting gate I3 | terminal STATUS, H3, H4, NSET1 |
| input of the buffer T1 | logic level "0" (ground) |
| output of the buffer T1 | terminal CKP, wire CK, input of I1 |
| Command input of the buffer T1 | Q2 |
| input of the buffer T2 | Q4 |
| output of the buffer T2 | terminal DTP, wire DT |
| Command input of the buffer T2 | NQ3 |
| input ACK | H1 |
| input NINIT | NSET2 |
| input ER | D3 |
| input DIN | D4 |
| output DOUT | terminal DTP, wire DT |
| Inputs of flip-flops D maintained on 1 (VDD voltage) | NCLR1, D2, NCLR3, NCLR4, NSET4 |
| Inputs of flip-flops D maintained on 0 (ground) | D1 |

Operation of the Circuit HWC:

The circuit HWC is set to data receive mode by taking the signal ER to 1. The input D3 is then on 1 and the output NQ3 is on 0. The buffer T2, controlled by the output NQ3, is in high impedance state and the output Q4 is isolated from the terminal DTP. When the master device (not represented), which is connected to the other end of the line CK/DT, sets the wire CK to 0 to indicate that a datum is available on the wire DT, the output of the gate I1 changes to 1. The input H2 receives a rising edge and triggers the flip-flop FD2 the output Q2 of which changes to 1, as the input D2 is constantly on 1. The change to 1 of the output Q2 activates the buffer T1, which becomes transparent and ties the wire CK to 0 (ground). Thus, in response to a falling edge on the wire CK, the circuit HWC automatically ties the wire CK to 0.

Simultaneously, the input of the gate I2 changes to 1 and the signal STATUS changes to 1 at the output of the gate I3, which allows the slave device to know that the master has tied the wire CK to 0. The slave device then reads the datum present on the terminal DOUT, which is connected to the wire DT. When the datum is read, and after the "data processing" step allowing, for example, the slave device to store the datum received in an internal memory, the slave device applies a positive pulse to the input ACK, i.e. to the input H1 of the flip-flop FD1. The output Q1 trips to 0 as, on the one hand, the input D1 of the flip-flop FD1 is constantly on 0 and on the other hand, Q2=NSET1=1. The change to 0 of the output Q1 is then on the input NCLR2 and changes the output Q2 of the flip-flop FD2 to 0. The buffer T1 then returns to high impedance state, and the wire CK is no longer tied to the ground by the circuit HWC. On the other side of the line, the release of the wire CK allows the master device to know that it can send a new datum (if the master device has already released the wire CK).

The circuit HWC is set to data send mode by taking the signal ER to 0. In this case, the input D3 of the flip-flop FD3 is on 0. The slave device applies a datum to be sent to the input D4 of the flip-flop FD4 via the input DIN of the circuit HWC.

When the master device, at the other end of the line, ties the wire CK to 0, the output of the gate I1 changes to 1 and the buffer T1 becomes transparent as described above, so that the wire CK is also tied to 0 by the circuit HWC. Simultaneously, the signal STATUS changes to 0, after a certain delay imposed by the two gates I2, I3, that have been provided for reasons of synchronization when changing from send mode to receive mode, or vice-versa. The inputs H3, H4 receive the rising edge of the signal STATUS, which triggers the flip-flops FD3, FD4. Thus, the output NQ3 changes to 1 (D3 receiving the signal ER which is equal to 0) and the buffer T2 becomes transparent. Simultaneously, the output Q4 delivers the datum present on the input D4, and the datum is therefore applied to the wire DT. After the "data processing" step which allows the slave device to apply a new datum to the terminal DIN, the slave device applies a positive pulse to the terminal ACK, which returns the buffer T1 to high impedance state. The signal STATUS returns to 0. At that instant, the wire CK returns to 1 if the master device has already read the datum and has already released the signal CK at the other end of the line. Otherwise, the wire CK subsequently returns to 1, when the master device has finished the reading operation and/or has performed other tasks.

When the wire CK returns to 1, the output of the gate I1 changes to 0, which activates the input NSET3 of the flip-flop FD3 and changes the output Q3 to 1 and the output NQ3 to 0. Thus, the output buffer T2 returns to high impedance state and the datum is no longer applied to the wire DT. When the master device ties the wire CK to 0 again, the new datum applied to the input DI will be delivered to the wire DT in the way that has just been described.

The terminal NINIT, which drives the input NSET2 of the flip-flop FD2, allows the output Q2 to be tied to 1 to tie the wire CK to 0 independently of bit transmission. This possibility can be used to implement a higher-level protocol allowing the slave device to indicate to the master device that it is ready to send data or that it is ready to receive data.

The two inverting gates I2 and I3 in series have a set switch delay that ensures that a rising edge on H3 will occur after the input NSET3 has changed to 1.

Example of an application of the Method According to the Present Invention

Figure 7:
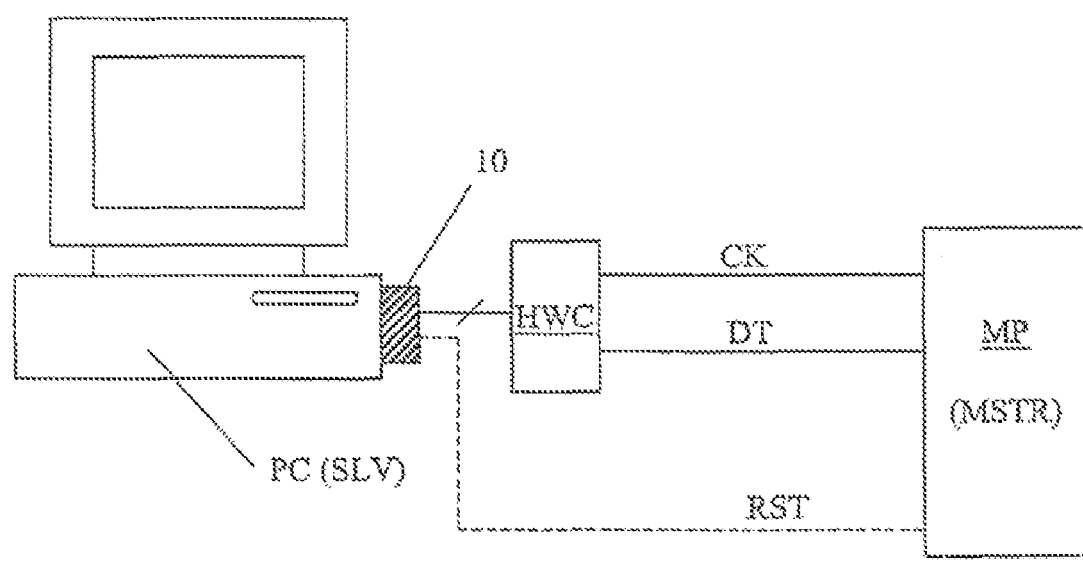
FIG. 7 is a schematic diagram illustrating an application of the method of the present invention to communication between a microcomputer and a microprocessor.

FIG. 7 illustrates an application of the method of the present invention to data transmission between a microcomputer PC and a microprocessor MP, to, for example, perform control, test or maintenance operations on the microprocessor MP via the microcomputer PC. The interface circuit HWC is arranged in a small box that is directly plugged into the connector 10 of the microcomputer parallel port. The clock CK and data DT wires are connected, on the one hand, to the circuit HWC and, on the other hand, to input/output ports of the microprocessor MP. The steps described in the flow charts in FIGS. 2A, 2B, 4A, 4B, except those that are performed automatically by the circuit HWC, are performed by programs provided in each of the devices PC, MP, such programs being within the understanding of those skilled in the art.

In practice, the implementation of the method according to the present invention requires the provision of a higher-level protocol with which it is possible to initialize a communication by determining which device must first send the data. Once the communication is underway, this protocol relies on commands transmitted via the data wire, which enables the two devices to know which one must send the next bit string. For example, the device which sends the data can indicate to the other one that it is going to send a determined number of bit strings (bytes for example) and that it is then going to set to receive mode, etc. Many embodiments can be imagined concerning this higher-level protocol, according to good practices.

Strictly speaking, a communication can be initialized as follows, when test operations on the microprocessor are planned. The microcomputer sets the microprocessor to 0 by applying a signal RST to one input of the microprocessor provided, then sends a determined number N of electric pulses to the microprocessor via the wire DT. The microprocessor has an internal counter that is activated after a reset to 0 and which counts the number N of pulses received. If this number corresponds to a predetermined number N1, the microprocessor trips to test mode and will read a test program recorded in its memory at a particular address. This test program tells it, for example, that it must set to receive mode to receive instructions to be processed. The microprocessor ties the wire CK to 0 to receive the first datum, and so on and so forth to receive a complete instruction.

It will be understood that a communication can be initialized in many other ways. For example, it can be arranged for the first device to set the clock wire to 0 at any instant to have the possibility of sending data to the other one, which shall then set to receive mode.

It will be understood that the method according to the present invention is susceptible of different applications and embodiments. In particular, although the present invention has been initially designed to provide a serial link between two devices, the present invention is also applicable to a parallel communication, which can be achieved quite simply by providing a plurality of data wires DT, in an amount that corresponds to the number of bits to be transferred in parallel. Moreover, although the method according to the present invention has been described above with a default logic value equal to 1, it will be understood that this value could be 0 via a pull-down resistor connected to the ground, the devices then tying the clock wire to 1 (VDD voltage) for a data exchange process. Finally, one embodiment of the present invention involves using two communication interface circuits, one slave, the other master, comprising software and hardware to perform all the steps of the method according to the present invention. These devices, or communication co-processors, can be included in all types of devices or connected to all types of devices to obtain a synchronous data transmission system enabling the devices to converse and to exchange serial data via only two wires, or parallel data via several data wires.

That which is claimed is:

1. A method of transmitting data between a master device and a slave device via a clock line and at least one data line, the clock line being maintained by default on a first logic value, and each master and slave device being able to tie the clock line to a potential representing a second logic value opposite the first logic value, the method comprising:

when the master device sending data to the slave device and the slave device is receiving the data from the master device, then the master device applies data to the data line, then ties the clock line to the second logic value, the slave device detects the second logic value on the clock line, then ties the clock line to the second logic value and reads the data, the slave device maintains the tie to the clock line at the second logic value while the slave device has not read the data, the slave releases the tie to the clock line at the second logic value when the slave device has read the data, and the master device maintains the data on the data line at least until an instant when the clock line is released by the slave device, the master device releases the data on the data line after the clock line is released by the slave device and by the master device; and when the slave device is sending data to the master device and the master device is receiving the data from the slave device, then the master device ties the clock line to the second logic value, the slave device detects the second logic value on the clock line, then ties the clock line to the second logic value, and then or simultaneously applies the data to the data line, the master device maintains the tie to the clock line at the second logic value while the master device has not read the data, the master device releases the tie to the clock line at the second logic value when the master device has read the data, the slave device maintains the data on the data line at least until an instant when the clock line is released by the master device, and the slave device releases the data on the data line after the clock line is released by the master device and the slave device, and with the slave device tying the clock line to the second logic value every time the master device has tied the clock line to the second logic value, regardless of the direction in which the data is transmitted.

2. A method according to claim 1, wherein a time period that the slave device has to release the clock line after receiving data, is independent of any action by the master device, as the master device does not send any new data while the slave device has not released the clock line.

3. A method according to claim 1, wherein when the clock line has the first logic value, a time period that the master device has to tie the clock line to the second logic value is independent of any action by the slave device.

4. A method according to claim 1, wherein the first logic value is 1 and the second logic value is 0.

5. A method according to claim 1, further comprising providing the slave device with a communication interface circuit including:

a trigger for automatically tying the clock line to the second logic value when the clock line is changing from the first logic value to the second logic value;

an input for applying a clock line release signal to the trigger; and an output for delivering a status signal that has a first value when the clock line is tied to the second logic value by the trigger and a second value when the clock line is released by the trigger.

6. A method according to claim 5, wherein the communication interface circuit further comprises:

storage for storing at least one data; and
an applicator for automatically applying the at least one stored data to the data line when the clock line changes from the first logic value to the second logic value.

7. A synchronous data transmission system comprising:
a clock line;
a data line;
a master device comprising
  a clock line connection terminal connected to the clock line,
  at least one data line connection terminal connected to the data line,
  a circuit for tying the clock line to a potential representing a second logic value that is the opposite of a first logic value, and
  a data sending unit for waiting for the clock line to have the first logic value, applying data to the data line, tying the clock line to the second logic value after the data is applied to the data line, then releasing the clock line, and maintaining the data on the data line at least until the clock line has the first logic value, when the data is to be sent; and
a slave device comprising
  a clock line connection terminal connected to the clock line,
  at least one data line connection terminal connected to the data line,
  a circuit for tying the clock line to the potential representing the second logic value,
  a detector for detecting a change from the first logic value to the second logic value on the clock line, tying the clock line to the second logic value, reading the data on the data line, and releasing the clock line, when the data is to be received; and
wherein when said master device is sending data to said slave device and said slave device is receiving the data from said master device, then
  said master device applies data to the data line, then ties the clock line to the second logic value,
  said slave device detects the second logic value on the clock line, then ties the clock line to the second logic value and reads the data,
  said slave device maintains the tie to the clock line at the second logic value while said slave device has not read the data,
  said slave releases the tie to the clock line at the second logic value when said slave device has read the data, and
  said master device maintains the data on the data line at least until an instant when the clock line is released by said slave device,
  said master device releases the data on the data line after the clock line is released by said slave device and by said master device; and
wherein when said slave device is sending data to said master device and said master device is receiving the data from said slave device, then
  said master device ties the clock line to the second logic value,
  said slave device detects the second logic value on the clock line, then ties the clock line to the second logic value, and then or simultaneously applies the data to the data line,
  said master device maintains the tie to the clock line at the second logic value while said master device has not read the data,
  said master device releases the tie to the clock line at the second logic value when said master device has read the data,
  said slave device maintains the data on the data line at least until an instant when the clock line is released by said master device, and
  said slave device releases the data on the data line after the clock line is released by said master device and said slave device,
  with said slave device tying the clock line to the second logic value every time said master device has tied the clock line to the second logic value, regardless of the direction in which the data is transmitted.

8. A system according to claim 7, wherein said master device further comprises a data receiving unit for waiting for the clock line to have the first logic value.

9. A system according to claim 7, wherein said slave device further comprises a detector for detecting a change from the first logic value to the second logic value on the clock line.

* * * * *